March 12, 1940.   V. M. DAVID   2,193,448
AIRPLANE
Filed Oct. 29, 1938   2 Sheets-Sheet 1

INVENTOR.
VICTOR. M. DAVID.
ATTORNEY.

March 12, 1940.  V. M. DAVID  2,193,448
AIRPLANE
Filed Oct. 29, 1938  2 Sheets-Sheet 2

INVENTOR.
VICTOR. M. DAVID.
Ernest E Carter
ATTORNEY.

Patented Mar. 12, 1940

2,193,448

UNITED STATES PATENT OFFICE 2,193,448

AIRPLANE

Victor M. David, Vancouver, British Columbia, Canada

Application October 29, 1938, Serial No. 237,712

3 Claims. (Cl. 244—56)

My invention relates to improvements in airplanes which are particularly adapted for use in aircraft using two or more motor units. The objects of the invention are to provide means whereby the propellers on opposite sides of the fuselage may be swung upon a horizontal axis in order that the propellers may be used to augment the lift of the craft to enable the craft to take off and land at lower speeds and in a shorter distance than heretofore. A further object is to provide safe and convenient means for controlling the movement of the propellers about said axis. A still further object is to house the means communicating with said motors to swing them in the leading edge of the wings, thus preventing wind resistances in excess of those of planes of the conventional type.

The invention consists essentially of an airplane having motor housings substantially semispherical at their rear end and being recessed into the leading edge of the wing and said housing being rockingly mounted about a horizontal axis, as will be more fully described in the following specification and shown in the accompanying drawings, in which—

In the drawings like characters of reference indicate corresponding parts in each figure.

Figure 1:
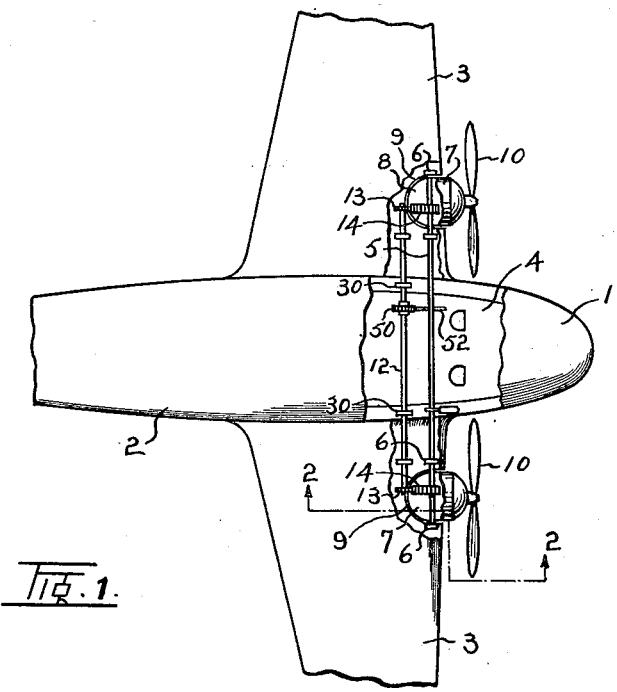
Fig. 1 is a plan view part in section of a portion of a twin motored airplane fitted with the invention.
Figure 2:
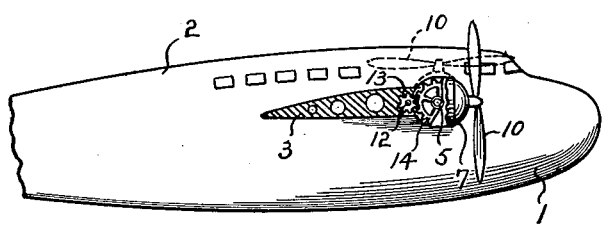
Fig. 2 is a part sectional view taken on the line 2—2 of Figure 1.

The numeral 1 indicates a twin motor monoplane having a fuselage 2 and wings 3 and in the fore part of the fuselage is the conventional pilots room 4. Extending horizontally through the fuselage and adjacent the leading edge of the wings is a main shaft 5 which is suitably journalled at intervals of its length as at 6 and secured adjacent the outer ends of the shaft 5 are motor housings 7. The motor housings are substantially semi-spherical at their rear end as at 8 and extend into gaps 9 formed in the leading edge of the wing, each of these ends 8 is mounted upon the shaft with said shafts extending through the horizontal axis of the sphere of which it forms a part so as to permit of the housing rocking about its axis whilst substantially filling the gap 9 in which it is fitted. The forward end of the housing 7 is of any desired shape and is fitted with a motor, not shown, which in turn carries a propeller 10.

Mounted to the rear of the shaft 5 is a counter shaft 12 which is suitably journalled intermediate its length and is fitted at each end with a pinion 13 having engagement with a quadrant 14 secured to the shaft 5 and enclosed within the rear end 8 of the motor housing. While in the embodiment shown, the shafts 5 and 12 are both mounted within the wing, it may be found desirable in some types of craft to mount the shaft 5 in front of the wing.

Figure 3:
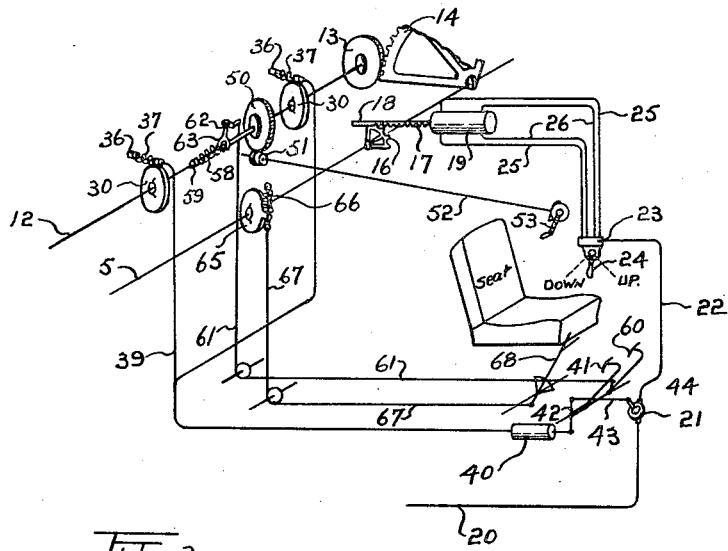
Fig. 3 is a diagrammatic view showing the preferred control of the rocking of the motor mounting.

The preferred method for tilting the motor housings is shown diagrammatically in Figure 3. Secured to the shaft 5 is a quadrant 16 which is rocked by a rack 17 carried by a piston rod 18 extending from a cylinder 19. The piston and consequently the rack 17 are moved in either direction by fluid pressure derived from any suitable source, such as from the intake manifold and is communicated to the cylinder 19 through a pipe 20, a normally closed valve 21, a pipe 22 and a control valve 23 of any suitable type having an operating lever 24, the control valve 23 being connected by flow pipes 25 and exhaust pipes 26 to the cylinder 19. The valve 23 would be so designed that when the lever is in neutral position as shown in Figure 3 the flow pipes 25 would be shut off and the exhaust pipes 26 open to atmosphere through the valve. When the lever is pushed to the right of the figure or away from the pilot's seat, the one exhaust would be closed and one flow pipe opened to the cylinder to move the rack 17 outwardly away from the cylinder and tilt the motor housings 7 and the propellers 10 upwardly. The movement of the lever to the left of neutral position would reverse the flow through the cylinder and return the propellers towards their normal horizontal position.

Figures 5, 6:
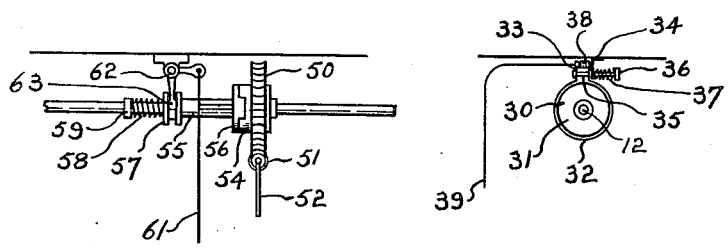
Fig. 5 is a detail view of the clutch and worm drive.
Fig. 6 is a detail view of one of the brakes.
Figure 4:
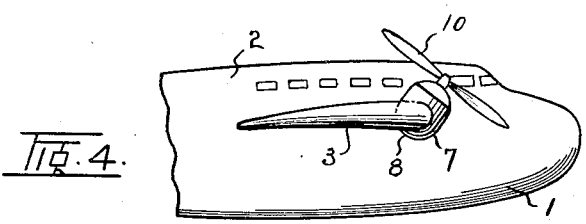
Fig. 4 is a side elevation of the airplane showing the propeller tilted.

Mounted adjacent the ends of the shaft 12 are suitable brakes 30 which may each consist of a brake drum 31 secured to the shaft 12, see Figures 3 and 6, which is surrounded by a brake band 32 having terminal ends 33, one of which is anchored to a suitable frame member as at 34. The opposite terminal end of the brake is provided with a rod 35 which passes through the opposite end of said band and is provided with a nut 36 at its outer end and a spring 37 for holding the band normally contracted about the drum 31. Between the terminal ends 33 of the brake band 32 a bellows 38 is disposed which is connected by a tube 39 from a hydraulic master cylinder 40 for the purpose of expanding the brake band. A brake pedal 41 is provided in front of the pilot's seat which controls the master cylinder 40 to take off the brakes 30 when depressed and to open, through the medium of an arm 42 a rod 43 and a valve lever 44 on the valve 21, so that operating pressure may be available at the control valve 23 as the brakes 30 are being released.

Mounted upon the shaft 12 is a worm gear 50 which is adapted to be rotated by a worm 51 upon a shaft 52 from a suitably geared hand crank 53 mounted adjacent the pilot's seat. The worm gear 50 is provided on one face with a half clutch member 54 and slidably but non-rotatably mounted upon the shaft 12 is a sleeve 55 having a corresponding half clutch member 56 at one end and a trunnion collar 57 at its opposite end. The sleeve 55 is normally held with the clutch members 54 and 56 engaged by a spring 58 which abuts the trunnion collar and a set collar 59 upon the shaft. A clutch pedal 60 is provided adjacent the pilot's seat which is connected through a cable 61 to a bell crank 62, one leg of which bell crank terminates in a fork 63 and engages the trunnion collar so that as the clutch pedal is depressed the clutch members separate to disconnect the worm gear 50 from driving engagement with the shaft 12.

I may provide a normally applied band brake 65 to the shaft 5, the band for which would be contracted by a spring 66 and expanded by a cable 67 operatively attached to a hand lever 68.

If the pilot is thoroughly familiar with his controls and has a satisfactory sense of touch, the brake 65 may be dispensed with or the hand lever 68 be drawn back prior to motor tilting, so as to free the shaft from resistance from said brake.

The tilting of the motor housing is accomplished in the following manner:

Assuming that the brake 65 is fitted, the pilot on desiring to tilt his propellers will first depress the clutch pedal 60 and the brake pedal 41. The clutch pedal will free the shaft 12 from its connection with the worm gear and the brake pedal will release the brakes from said shaft and also open the valve 21 that fluid may flow to the control valve 23. The control valve 23 is next moved in an appropriate direction that the rack 17 may rock the quadrant 16, the shaft 5 and the motor housings 7 to tilt the propellers as desired. The brake 65 being applied will prevent the movement of the shaft 5 and its parts, hence the hand lever 68 must be drawn back as desired to allow the shaft to rock.

If the brake 65 is not installed, the control valve 23 alone is used to tilt the motors to the desired position and when that position is attained the control valve 23 is returned to normal position and the clutch and brake levers allowed to return to normal position also, when the shaft 12 will again be held against further movement by the brakes 30.

If it is necessary to resort to hand tilting the brake pedal 41 is depressed, the clutch pedal 60 allowed to remain in normal position and the hand crank 53 is turned to rotate the shaft 12 and through the pinions 13 and the quadrant 14 rock the shaft 5 and its motor mountings.

What I claim as my invention is:

1. An aircraft having a housing supporting a propeller, a main shaft upon which said housing is mounted, a countershaft operatively connected to the main shaft, manual means for rotating the countershaft, a normally engaged brake engaging one of said shafts to hold the housing against tilting, fluid pressure operating means for rocking the main shaft means for controlling the fluid pressure operating means, means independent of the fluid pressure controlling means for normally preventing the setting in motion of the fluid pressure controlling means, and means for simultaneously putting the preventive means out of action and for releasing the brake.

2. An aircraft having a housing supporting a propeller, a main shaft upon which said housing is mounted, said shaft being parallel to the leading edge of the aircraft wings, a countershaft operatively connected to said shaft, a brake normally holding the shafts against rotation, fluid pressure means for rotating the shafts, a pipe in communication with a source of fluid under pressure, a manually operated valve in said pipe for controlling the fluid pressure means, a normally closed valve in said pipe, and means for simultaneously opening said normally closed valve and releasing the brake.

3. An aircraft having a fuselage with wings extending on opposite sides, a main shaft parallel to the leading edge of said wings, a countershaft operatively connected to said shaft, a motor housing adjacent each end of the main shaft, a brake normally holding the shafts against rotation, and fluid pressure means for rotating the shafts, a manually operated valve for controlling the fluid pressure means, said valve being adapted for communication through a pipe with a source of fluid under pressure, a normally closed valve in said pipe, and means for simultaneously opening said normally closed valve and releasing the brake.

VICTOR M. DAVID.